US012525390B2

(12) United States Patent
Kwon et al.

(10) Patent No.: US 12,525,390 B2
(45) Date of Patent: Jan. 13, 2026

(54) COIL STRUCTURE, POWER FACTOR CORRECTION CIRCUIT INCLUDING THE COIL STRUCTURE, AND POWER SUPPLY INCLUDING THE POWER FACTOR CORRECTION CIRCUIT

(71) Applicant: SOLUM CO., LTD., Yongin-si (KR)

(72) Inventors: Chang Yong Kwon, Suwon-si (KR); Dong Kyun Ryu, Seoul (KR); Yun Sic Bang, Uiwang-si (KR)

(73) Assignee: SOLUM CO., LTD.

( * ) Notice: Subject to any disclaimer, the term of this patent is extended or adjusted under 35 U.S.C. 154(b) by 1161 days.

(21) Appl. No.: 17/471,920

(22) Filed: Sep. 10, 2021

(65) Prior Publication Data

US 2022/0385174 A1 Dec. 1, 2022

(30) Foreign Application Priority Data

May 28, 2021 (KR) ........................ 10-2021-0069535

(51) Int. Cl.

| | |
|---|---|
| ***H01F 27/32*** | (2006.01) |
| ***H01F 27/02*** | (2006.01) |
| ***H01F 27/28*** | (2006.01) |

(52) U.S. Cl.

CPC ........... *H01F 27/325* (2013.01); *H01F 27/02* (2013.01); *H01F 27/2823* (2013.01)

(58) Field of Classification Search

CPC ................. H01F 5/02; H01F 2005/022; H01F 2005/025; H01F 27/325; H01F 2005/046; H01F 27/02; H01F 27/2823

USPC ........................................ 336/196, 198, 208

See application file for complete search history.

(56) References Cited

U.S. PATENT DOCUMENTS

| | | | | |
|---|---|---|---|---|
| 8,498,124 | B1 * | 7/2013 | Folker | H01F 27/06 361/740 |
| 2002/0067237 | A1 | 6/2002 | Nakata et al. | |
| 2007/0171022 | A1 | 7/2007 | Marui et al. | |
| 2008/0252409 | A1 | 10/2008 | Kojima | |
| 2012/0106019 | A1 * | 5/2012 | Buxton | H01F 7/1877 361/152 |
| 2015/0145630 | A1 * | 5/2015 | Suzuki | H01F 38/14 336/200 |
| 2018/0166928 | A1 * | 6/2018 | Wu | H01F 38/14 |
| 2019/0378641 | A1 * | 12/2019 | Kang | H01F 27/32 |

(Continued)

FOREIGN PATENT DOCUMENTS

| | | | | |
|---|---|---|---|---|
| JP | 2003169479 A | * | 6/2003 | H02M 1/36 |
| JP | 2008066392 A | * | 3/2008 | |
| JP | 2009043512 A | * | 2/2009 | |

(Continued)

*Primary Examiner* — Tszfung J Chan

(74) *Attorney, Agent, or Firm* — Perman & Green, LLP

(57) ABSTRACT

Provided is a coil structure including an inductor coil having a self-bonding wire structure and including a central hole, a detection coil electromagnetically coupled to the inductor coil, a support unit surrounding at least a portion of an outer periphery of the inductor coil, and a housing including an upper magnetic body and a lower magnetic body facing each other in a vertical direction with the inductor coil therebetween to form an inner space in which the inductor coil and the detection coil are provided, the upper magnetic body and the lower magnetic body each including a protrusion inserted into the central hole of the inductor coil.

18 Claims, 15 Drawing Sheets

(56) References Cited

U.S. PATENT DOCUMENTS

2020/0015913 A1* 1/2020 King ......................... H01F 5/02

FOREIGN PATENT DOCUMENTS

| | | | | | |
|---|---|---|---|---|---|
| KR | 1020150111425 | | | 10/2015 | |
| KR | 2017008072 | A | * | 1/2017 | ............. H01F 27/24 |
| KR | 2066735 | B1 | * | 1/2020 | ........... H01F 27/022 |
| KR | 1020200055942 | | | 5/2020 | |
| WO | WO-2014081155 | A1 | * | 5/2014 | ............. H01F 27/24 |
| WO | 2020138991 | | | 7/2020 | |

* cited by examiner

COIL STRUCTURE, POWER FACTOR CORRECTION CIRCUIT INCLUDING THE COIL STRUCTURE, AND POWER SUPPLY INCLUDING THE POWER FACTOR CORRECTION CIRCUIT

CROSS-REFERENCE TO RELATED APPLICATION

This application is based on and claims priority under 35 U.S.C. § 119 to Korean Patent Application No. 10-2021-0069535, filed on May 28, 2021, in the Korean Intellectual Property Office, the disclosure of which is incorporated by reference herein in its entirety.

BACKGROUND

1. Field

The present disclosure relates to a coil structure, a power factor correction circuit including the coil structure, and a power supply including the power factor correction circuit.

2. Description of the Related Art

Recently, as a device for supplying power to various home appliances, a switching mode power supply (SMPS) has been attracting attention. The SMPS is a device for providing stable power by using a transformer and a switching device such as a metal oxide semiconductor field effect transistor (MOSFET) or a bipolar junction transistor (BJT).

The SMPS includes a power factor correction (PFC) circuit for improving power supply efficiency when power is supplied using commercial AC power, an isolated DC-DC converter, and a transformer to meet safety standards.

In this case, the PFC circuit and the transformer include a coil. For example, the PFC circuit includes an inductor coil for correcting a power factor, and the transformer includes a primary coil and a secondary coil for transformation.

In particular, the PFC circuit may include a structure in which an inductor coil is wound around a bobbin having flat upper and lower flange portions. The upper and lower flange portions may support the inductor coil wound around the bobbin. In this case, because both the upper and lower flanges have a certain thickness, there may be a limit to slimming the PFC circuit.

Recently, as home appliances are developed in pursuit of miniaturization, SMPSs applied to various home appliances are also required to be implemented in a slim form. Accordingly, there is a need for a method for slimming the PFC circuit applied to the SMPSs.

SUMMARY

Provided are a slimmed coil structure applicable to a power factor correction (PFC) circuit, a PFC circuit including the slimmed coil structure, and a power supply including the PFC circuit.

Additional aspects will be set forth in part in the description which follows and, in part, will be apparent from the description, or may be learned by practice of the presented embodiments of the disclosure.

According to an aspect of an embodiment, a coil structure includes an inductor coil including a self-bonding wire and a central hole, a detection coil electromagnetically coupled to the inductor coil, a support unit surrounding at least a portion of an outer periphery of the inductor coil, and a housing including an upper magnetic body and a lower magnetic body facing each other in a vertical direction with the inductor coil therebetween to form an inner space in which the inductor coil and the detection coil are provided, the upper magnetic body and the lower magnetic body each including a protrusion inserted into the central hole of the inductor coil.

Each of the upper magnetic body and the lower magnetic body may include a flat plate in which the protrusion is provided in a center thereof, and a first edge structure and a second edge structure provided on both sides of the protrusion and surrounding the protrusion.

The first edge structure and the second edge structure may face each other in a first direction.

The housing may include an opening exposing the inner space to the outside on both sides of the housing in a second direction crossing the first direction.

The support unit may include a bobbin including a support plate having a groove provided in a partial region and a pillar extending upwardly from a center of the support plate.

A through hole may be formed in the centers of the support plate and the pillar.

The inductor coil may be provided on the support plate to surround the pillar, and the detection coil may be inserted into the groove.

The lower magnetic body may cover a lower surface of the support plate, the upper magnetic body may cover an upper portion of the pillar and the inductor coil, and the protrusion of each of the lower magnetic body and the upper magnetic body may be inserted into the through hole.

The bobbin may includes a first sidewall provided on one side of the pillar and a second sidewall provided on the other side of the pillar.

The first sidewall may have a shape extending upwardly from an edge region of the support plate, and the second sidewall may have a shape extending upwardly from another edge region of the support plate.

The first sidewall and the second sidewall may face each other in the second direction.

Each of the first sidewall and the second sidewall may include a curved portion corresponding to at least a portion of the outer periphery of the inductor coil.

At least a portion of the first sidewall and at least a portion of the second sidewall may protrude to the outside of the housing in the second direction through the opening of the housing.

The height of the pillar may be about 2 mm or less.

The groove may have a ring shape.

The width of the groove may be greater than the width of the detection coil.

The depth of the groove may be about 0.5 mm or less.

The thickness of the support plate may be about 1 mm or less.

The detection coil may surround an edge of the inductor coil.

The support unit may surround at least a portion of the outer periphery of the inductor coil.

At least a portion of the support unit protrudes to the outside of the housing in the second direction through the opening of the housing.

The coil structure may further include an insulating layer provided in at least one of a first region between the lower magnetic body and the inductor coil and a second region between the upper magnetic body and the inductor coil, the insulating layer surrounding the protrusion.

The inductor coil may be formed by winding a first wire having conductivity in a double layer.

The detection coil may include a self-bonding wire.

The diameter of a cross section of a second wire constituting the detection coil may be less than the diameter of a cross section of a first wire constituting the inductor coil.

The diameter of the cross section of the second wire constituting the detection coil may be about 0.5 mm or less.

According to an aspect of another embodiment, a power factor correction circuit includes a plurality of coil structures, a printed circuit board on which the plurality of coil structures are mounted, and an electromagnetic signal detector that detects electromagnetic signals from the plurality of coil structures.

Each of the plurality of coil structures may include an inductor coil having a self-bonding wire structure and including a central hole, a detection coil electromagnetically coupled to the inductor coil, a support unit surrounding at least a portion of an outer periphery of the inductor coil, and a housing including an upper magnetic body and a lower magnetic body facing each other in a vertical direction with the inductor coil therebetween to form an inner space in which the inductor coil and the detection coil are provided, the upper magnetic body and the lower magnetic body each including a protrusion inserted into the central hole of the inductor coil.

According to an aspect of another embodiment, a power supply includes a rectifier that rectifies an AC voltage applied from the outside, a transformer that modulates a voltage rectified by the rectifier, and a power factor correction circuit that improves a power factor for the transformer.

The power factor correction circuit may include an inductor coil having a self-bonding wire structure and including a central hole, a detection coil electromagnetically coupled to the inductor coil, a support unit surrounding at least a portion of an outer periphery of the inductor coil, and a housing including an upper magnetic body and a lower magnetic body facing each other in a vertical direction with the inductor coil therebetween to form an inner space in which the inductor coil and the detection coil are provided, the upper magnetic body and the lower magnetic body each including a protrusion inserted into the central hole of the inductor coil.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
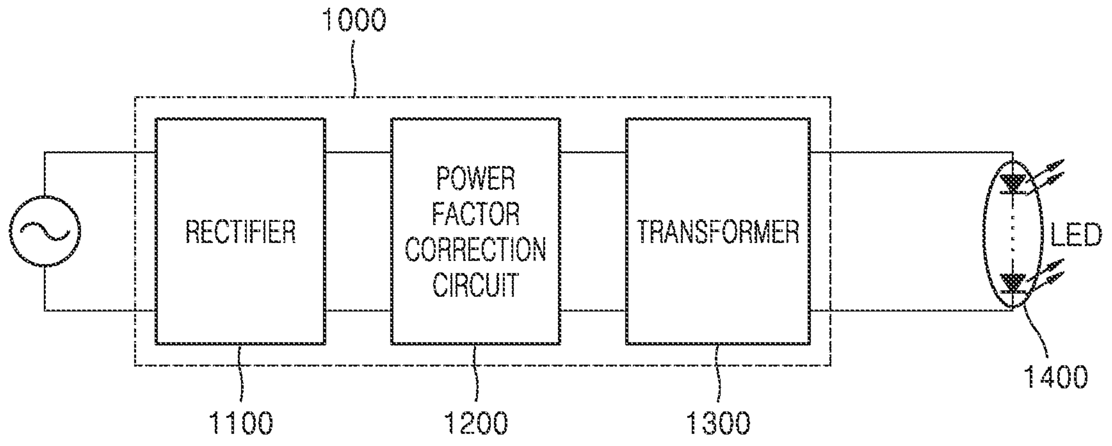
FIG. 1 is a schematic block diagram illustrating an example structure of a power supply according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the drawings, the size or thickness of each component may be exaggerated for clarity and convenience. Meanwhile, embodiments to be described below are merely exemplary, and various modifications are possible from these embodiments.

Hereinafter, what is described as "on" or "over" may include not only that which is directly above in contact, but also that which is above in a non-contact manner. As used herein, the singular forms "a", "an" and "the" are intended to include the plural forms as well, unless the context clearly indicates otherwise. When a part is said to "include" a component, this means that other components may be further included instead of excluding other components, unless otherwise stated.

The use of the term "above-described" and similar indication terms may correspond to both singular and plural. Unless explicitly stated or contrary to steps constituting a method, the steps may be performed in a suitable order. It is not necessarily limited to the order of description of the above steps.

Although the terms "first", "second", etc., may be used herein to describe various elements, components, regions, and/or layers, these elements, components, regions, and/or layers should not be limited by these terms. These terms are used only to distinguish one component from another, not for purposes of limitation.

FIG. 1 is a schematic block diagram illustrating an example structure of a power supply 1000 according to an embodiment.

Referring to FIG. 1, the power supply 1000 may include a rectifier 1100 for rectifying an AC voltage applied from the outside, a transformer 1300 for modulating a voltage rectified by the rectifier 1100, and a power factor correction (PFC) circuit 1200 for improving a power factor for the transformer 1300.

The rectifier 1100 may rectify an AC voltage applied from an external AC power supply and output a rectified voltage. For example, the rectifier 1100 may include a bridge rectifier. However, the disclosure is not limited thereto, and the rectifier 1100 may include various types of rectifying devices capable of rectifying an AC voltage.

The PFC circuit 1200 may include a coil structure capable of correcting a power factor for the transformer 1300 in order to increase the transformation efficiency of the transformer 1300. For example, the PFC circuit 1200 may include a plurality of coil structures or a single coil structure. A coil structure included in the PFC circuit 1200 may include an inductor coil having a certain inductance, a detection coil for detecting a change in current of the inductor coil, and a bobbin on which the inductor coil and the detection coil are mounted. In addition, the coil structure may further include a magnetic body passing through the centers of the inductor coil and the detection coil. The PFC circuit 1200 may have a certain inductance and may be electrically connected to the transformer 1300 to correct a power factor for the transformer 1300. An example configuration of the coil structure included in the PFC circuit 1200 is described below with reference to FIGS. 2 to 14.

When a current change occurs in the inductor coil, a change in magnetic flux may occur in the magnetic body, and the change in magnetic flux may generate an induced electromotive force in the detection coil. A change in current in the inductor coil may be detected by measuring the induced electromotive force generated in the detection coil.

The PFC circuit 1200 may be electrically connected to the rectifier 1100 and the transformer 1300. For example, as shown in FIG. 1, the PFC circuit 1200 may be located between the rectifier 1100 and the transformer 1300. However, the disclosure is not limited thereto, and the PFC circuit 1200 may be provided to be spaced apart from the rectifier 1100 with the transformer 1300 therebetween.

The transformer 1300 may modulate an AC voltage applied from an external AC power supply and rectified by the rectifier 1100 and output a modulated voltage. The transformer 1300 may include a primary coil and a secondary coil. The primary coil and the secondary coil of the transformer 1300 may be wound around the same magnetic body. A change in magnetic flux caused by a current flowing through the primary coil may affect the secondary coil through the magnetic body, and accordingly, an induced electromotive force may be generated in the secondary coil. The magnitude of the induced electromotive force generated in the secondary coil may vary according to winding ratios of the primary coil and the secondary coil. As such, the transformer 1300 may adjust the magnitude of an output voltage by including the primary coil and the secondary coil having different winding ratios.

A light-emitting diode (LED) 1400 is an example of a load to which a voltage output from the power supply 1000 is applied, and may be a light-emitting device. For example, the LED 1400 may include a plurality of light-emitting diodes. The power supply 1000 may convert an AC voltage applied from the outside into a DC voltage having a certain level and output the DC voltage to the LED 1400. However, the disclosure is not limited thereto, and the voltage output from the power supply 1000 may be transmitted to various types of loads other than the LED 1400.

Figure 2:
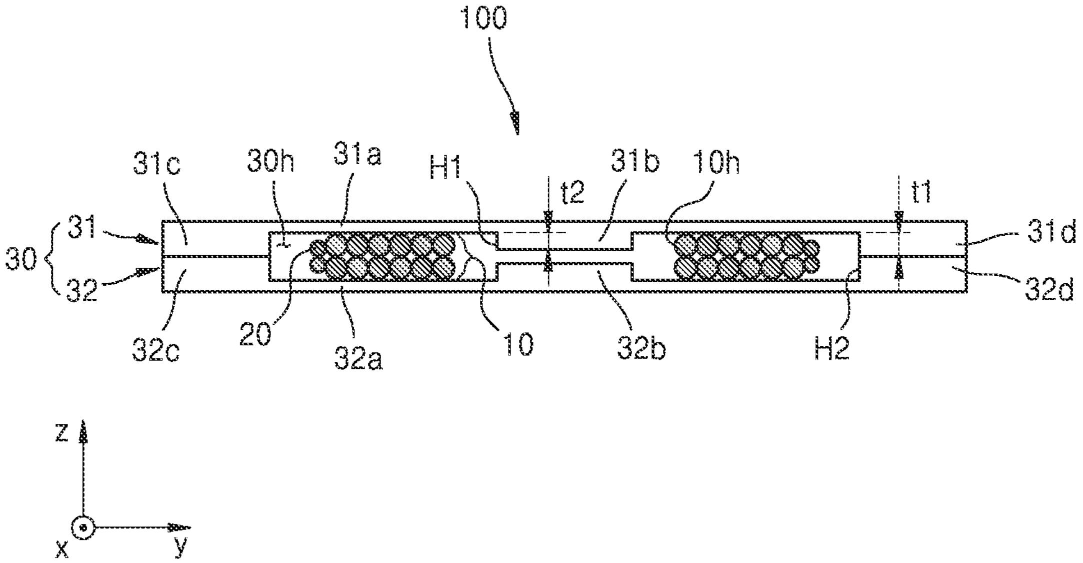
FIG. 2 is a schematic side cross-sectional view illustrating an example structure of a coil structure according to an embodiment.
Figure 3:
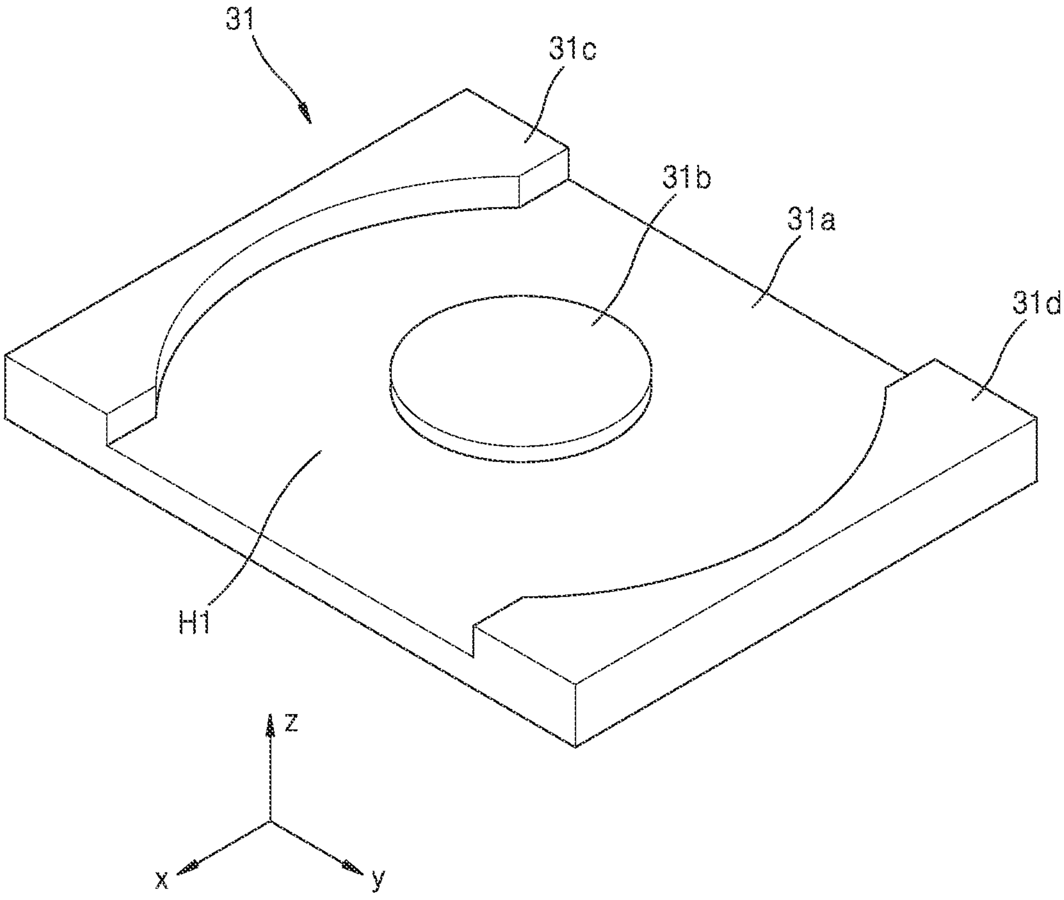
FIG. 3 is a schematic perspective view illustrating an example structure of an upper magnetic body included in the coil structure of FIG. 2.

FIG. 2 is a schematic side cross-sectional view illustrating an example structure of a coil structure 100 according to an embodiment. FIG. 3 is a schematic perspective view illustrating an example structure of an upper magnetic body 31 included in the coil structure 100 of FIG. 2.

Referring to FIG. 2, the coil structure 100 may include an inductor coil 10, a detection coil 20 for detecting a change in current of the inductor coil 10, and a housing 30 forming an inner space in which the inductor coil 10 and the detection coil 20 are provided. The coil structure 100 may be applied to a PFC circuit 1200 included in the power supply 1000 of FIG. 1.

The coil structure 100 may include an inductor coil 10 having a self-bonding wire structure and including a central hole **10*h*, a detection coil 20 electromagnetically coupled to the inductor coil 10, and a housing 30 including an upper magnetic body 31 and a lower magnetic body 32 facing each other in a vertical direction with the inductor coil 10 therebetween to form an inner space in which the inductor coil 10 and the detection coil 20 are provided, the upper magnetic body 31 and the lower magnetic body 32 respectively including protrusions 31*b* and 32*b* inserted into the central hole 10*h* of the inductor coil 10**.

The inductor coil 10 may include a self-bonding wire. The self-bonding wire may be a wire structure formed by winding a conductive wire in a certain shape and then fixing the conductive wire by heat or pressure treatment. For example, the inductor coil 10 may have a disk shape in which the central hole **10*h* is formed in the center thereof. As shown in FIG. 2, the protrusions 31*b* and 32*b* of the upper magnetic body 31 and the lower magnetic body 32 may be inserted into the central hole 10*h* formed in the center of the inductor coil 10. The protrusions 31*b* and 32*b* may be fitted in close contact with the central hole 10*h* of the inductor coil 10, and accordingly, the inductor coil 10 may be fixed to the housing 30. However, the disclosure is not limited thereto, and a certain space may be formed between the inner surface of the inductor coil 10 and the protrusions 31*b* and 32*b***.

A pair of lead wires (not shown) may be drawn out from the inductor coil 10. A current may be applied from the pair of lead wires to flow a current through the inductor coil 10, and accordingly, a change in magnetic flux may occur around the inductor coil 10.

The detection coil 20 may include a self-bonding wire. The detection coil 20 may have a disk shape in which a central hole is formed in the center thereof. As shown in FIG. 2, the detection coil 20 may be provided to surround the edge of the inductor coil 10. For example, the detection coil 20 may wind around the inductor coil 10. Also, the detection coil 20 may contact the inductor coil 10. However, the disclosure is not limited thereto, and the detection coil 20 may be formed so as not to contact the inductor coil 10. A pair of lead wires (not shown) may be drawn out from the detection coil 20. When a current change occurs in the inductor coil 10, a change in magnetic flux may occur around the inductor coil 10. An induced electromotive force may be generated in the detection coil 20 by a change in magnetic flux occurring around the inductor coil 10. A current may flow through the detection coil 20 by the induced electromotive force, and the current may be detected through the pair of lead wires of the detection coil 20.

The housing 30 may have magnetism and may form an inner space in which the inductor coil 10 and the detection coil 20 are provided. The housing 30 may include an upper magnetic body 31 and a lower magnetic body 32 facing each other. The upper magnetic body 31 may include a first plate 31*a* of a flat plate type having a first protrusion 31*b* in the center thereof, and a first edge structure 31*c* and a second edge structure 31*d*, which are provided on both sides of the first protrusion 31*b* and surround the first protrusion 31*b*.

The first edge structure 31*c* and the second edge structure 31*d* may have the same height t1 as each other. A height t2 of the first protrusion 31*b* may be less than a height t1 of the first edge structure 31*c* and the second edge structure 31*d*. However, the disclosure is not limited thereto, and the height t2 of the first protrusion 31*b* may be equal to the height t1 of the first edge structure 31*c* and the second edge structure 31*d*.

Referring to FIG. 3, the first edge structure 31*c* and the second edge structure 31*d* may be provided to face each other in a first direction (a y-axis direction). Accordingly, the first edge structure 31*c* and the second edge structure 31*d* may be provided on a straight line in the first direction (the y-axis direction) with the first protrusion 31*b* therebetween. In other words, the first edge structure 31*c* and the second edge structure 31*d* may be provided to be spaced apart from each other on both sides of the first protrusion 31*b* in the first direction (the y-axis direction). Edge structures may not be provided on both sides of the first protrusion 31*b* in a second direction (an x-axis direction) crossing the first direction. Accordingly, the housing 30 may include an opening 30*h* exposing the inner space to the outside on both sides thereof in the second direction (the x-axis direction).

A first coil groove H1 may be formed between the first protrusion 31*b* and the first and second edge structures 31*c* and 31*d*. The first coil groove H1 may have a shape corresponding to the shape of the inductor coil 10. Accordingly, the inductor coil 10 may be seated in the first coil groove H1. In order for the first coil groove H1 to have a shape corresponding to the shape of the inductor coil 10, the sides of the first edge structure 31*c* and the second edge structure 31*d*, which face the first protrusion 31*b*, may have certain curved surfaces.

The lower magnetic body 32 may include a second plate 32*a* of a flat plate type having a second protrusion 32*b* in the center thereof, and a third edge structure 32*c* and a fourth edge structure 32*d*, which are provided on both sides of the second protrusion 32*b* and surround the second protrusion 32*b*. The lower magnetic body 32 may also include a second coil groove H2. The descriptions of the configuration of the upper magnetic body 31 may be substantially identically applied to the configuration of the lower magnetic body 32.

The upper magnetic body 31 and the lower magnetic body 32 may be provided to face each other. The first edge structure 31*c* of the upper magnetic body 31 and the third edge structure 32*c* of the lower magnetic body 32 may be in contact with each other. Also, the second edge structure 31*d* of the upper magnetic body 31 and the fourth edge structure 32*d* of the lower magnetic body 32 may be in contact with each other. On the other hand, the first protrusion 31*b* and the second protrusion 32*b* may be formed so as not to contact each other. However, the disclosure is not limited thereto, and the first protrusion 31*b* and the second protrusion 32*b* may be formed to contact each other.

The first protrusion 31*b* and the second protrusion 32*b* may be surrounded by the inductor coil 10 by being inserted into the central hole 10*h*. When a current flows through the inductor coil 10, a change in magnetic flux may occur around the inductor coil 10. The change in magnetic flux occurring around the inductor coil 10 may be increased by the first protrusion 31*b* and the second protrusion 32*b*.

The upper magnetic body 31 and the lower magnetic body 32 may be coupled to each other by a coupling tape (not shown) surrounding the outer peripheries of the upper magnetic body 31 and the lower magnetic body 32. However, the disclosure is not limited thereto, and by inserting an adhesive material between the first edge structure 31*c* and the third edge structure 32*c* or between the second edge structure 31*d* and the fourth edge structure 32*d*, the upper magnetic body 31 and the lower magnetic body 32 may be coupled to each other.

Figure 4:
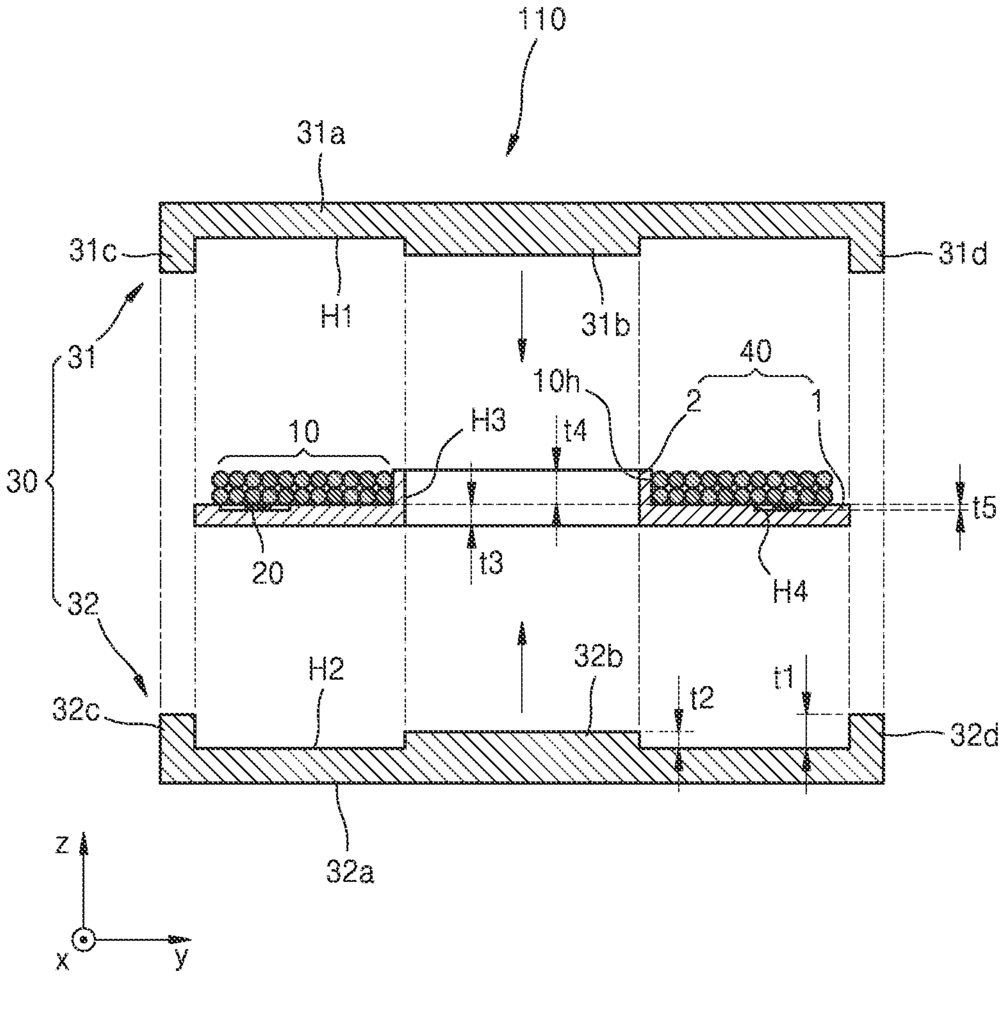
FIG. 4 is a schematic perspective view illustrating an example structure of a coil structure according to another embodiment.

FIG. 4 is a schematic perspective view illustrating an example structure of a coil structure 110 according to another embodiment. The coil structure 110 of FIG. 4 may be substantially the same as the coil structure 100 of FIG. 2, except that the coil structure 110 further includes a bobbin 40. Regarding FIG. 4, descriptions that are the same as those with respect to FIGS. 2 and 3 are omitted.

Referring to FIG. 4, the coil structure 110 may include an inductor coil 10, a detection coil 20 for detecting a change in current of the inductor coil 10, a housing 30 forming an inner space in which the inductor coil 10 and the detection coil 20 are provided, and a bobbin 40 provided in the inner space of the housing 30 and on which the inductor coil 10 and the detection coil 20 are mounted.

The bobbin 40 may include a support plate 1 and a pillar 2. The bobbin 40 may be a structure that supports the inductor coil 10, and may be referred to as a 'support unit'. The support plate 1 may be a structure that supports the inductor coil 10 and the detection coil 20. For example, the support plate 1 may support lower portions of the inductor coil 10 and the detection coil 20. The inductor coil 10 and the detection coil 20 may each include a wire structure formed by winding a self-bonding wire in a ring shape. The support plate 1 may have a disk shape to support the inductor coil 10 and the detection coil 20 each having a ring shape. However, the disclosure is not limited thereto, and the support plate 1 may have various shapes other than the disk shape. A thickness t3 of the support plate 1 may be about 1 mm or less. However, the disclosure is not limited thereto, and if necessary, the support plate 1 may be formed to have a thickness t3 that is greater than 1 mm.

At the center of the support plate 1, the pillar 2 extending upwardly may be formed. The pillar 2 may be formed to be inserted into the central hole 10*h* of the inductor coil 10. When the pillar 2 is inserted into the central hole 10*h*, the inductor coil 10 may be provided to surround the pillar 2. The pillar 2 may be inserted into the central hole 10*h* of the inductor coil 10 to be in close contact with the central hole 10*h*, and accordingly, the inductor coil 10 may be fixed to the bobbin 40. For example, a height t4 of the pillar 2 may be about 2 mm or less. However, the disclosure is not limited thereto, and if necessary, the pillar 2 may be formed to have a height t4 that is greater than 2 mm. A through hole H3 may be formed in the center of the pillar 2. Accordingly, the pillar 2 may have a hollow cylindrical shape. However, the disclosure is not limited thereto, and the pillar 2 may have a hollow polygonal pillar shape.

A groove H4 into which the detection coil 20 may be inserted may be formed in a partial region of the support plate 1. The groove H4 may have a ring shape. The ring shape of the groove H4 may correspond to the ring shape of the detection coil 20. The detection coil 20 may be inserted into the groove H4. The inductor coil 10 may be provided on the support plate 1, and the detection coil 20 may be inserted into the groove H4, and thus, the detection coil 20 may be provided under the inductor coil 10. As shown in FIG. 4, the detection coil 20 may be formed to contact the inductor coil 10. However, the disclosure is not limited thereto, and the detection coil 20 may be formed so as not to contact the inductor coil 10. A depth t5 of the groove H4 may be about 0.5 mm or less. However, the disclosure is not limited thereto, and if necessary, the groove H4 may be formed to have a depth t5 greater than 0.5 mm.

The bobbin 40 may include a support plate 1 for supporting a lower portion of the inductor coil 10, and may not include an upper plate (not shown) covering an upper portion of the inductor coil 10 and the pillar 2. Because the inductor coil 10 includes a self-bonding wire, and thus, the inductor coil 10 may be stably fixed even in the bobbin 40 without an upper plate, the upper plate may not be necessary. Accordingly, the bobbin 40 may be slimmed by the thickness of the upper plate that is not included.

The lower magnetic body 32 may cover a lower portion of the support plate 1, and the upper magnetic body 31 may be provided to cover the inductor coil 10. Each of the protrusions 31*b* and 32*b* of the lower magnetic body 32 and the upper magnetic body 31 may be provided to be inserted into the through hole H3.

Figure 5:
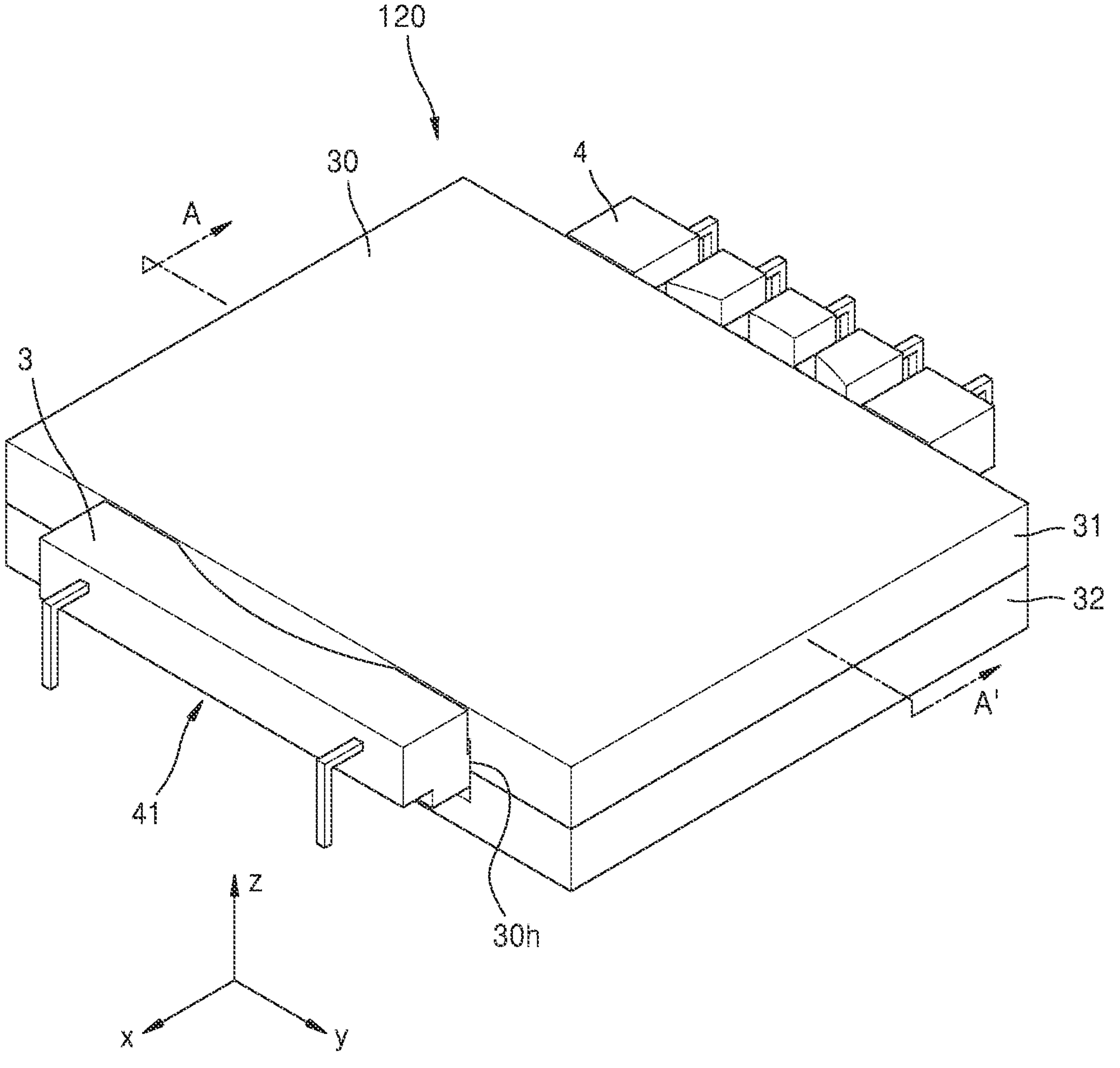
FIG. 5 is a schematic perspective view illustrating an example structure of a coil structure according to another embodiment.
Figure 6:
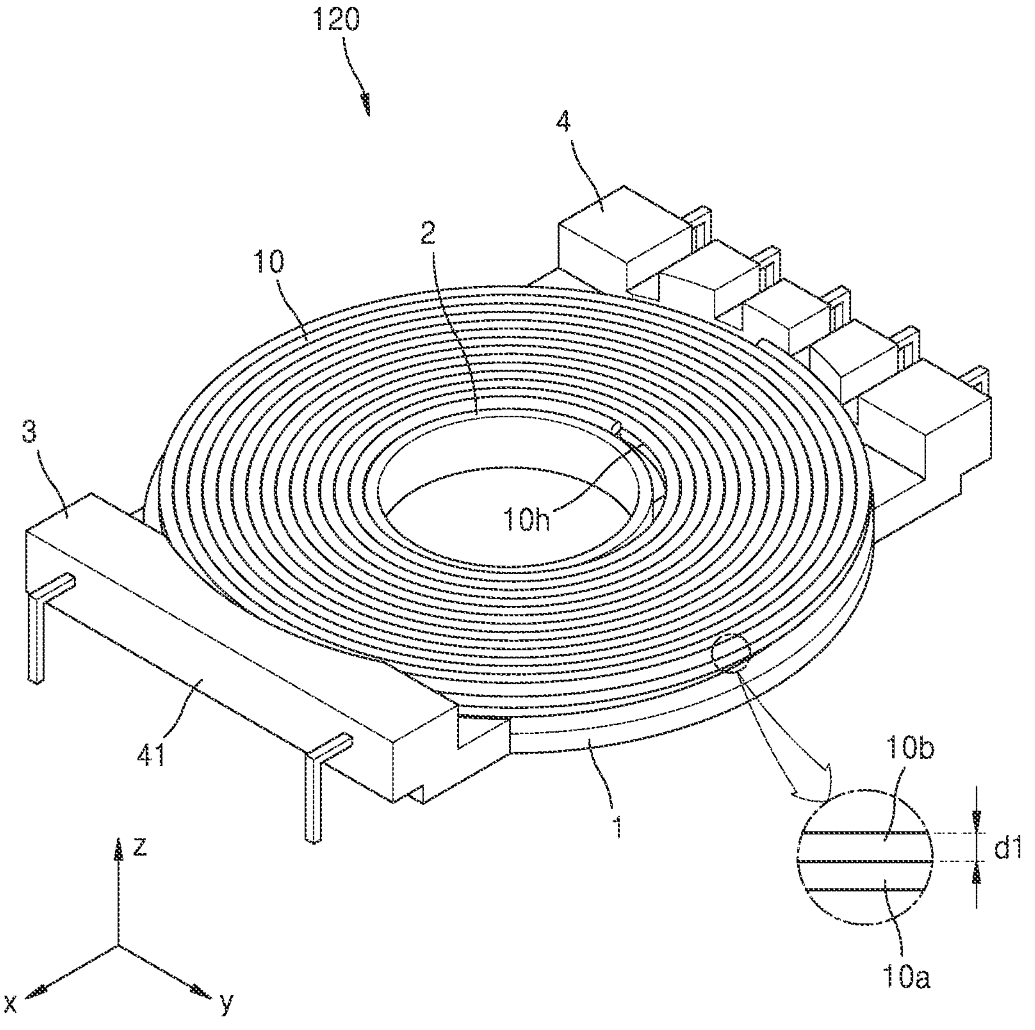
FIG. 6 is a schematic perspective view illustrating an example internal structure of the coil structure of FIG. 5.
Figure 7:
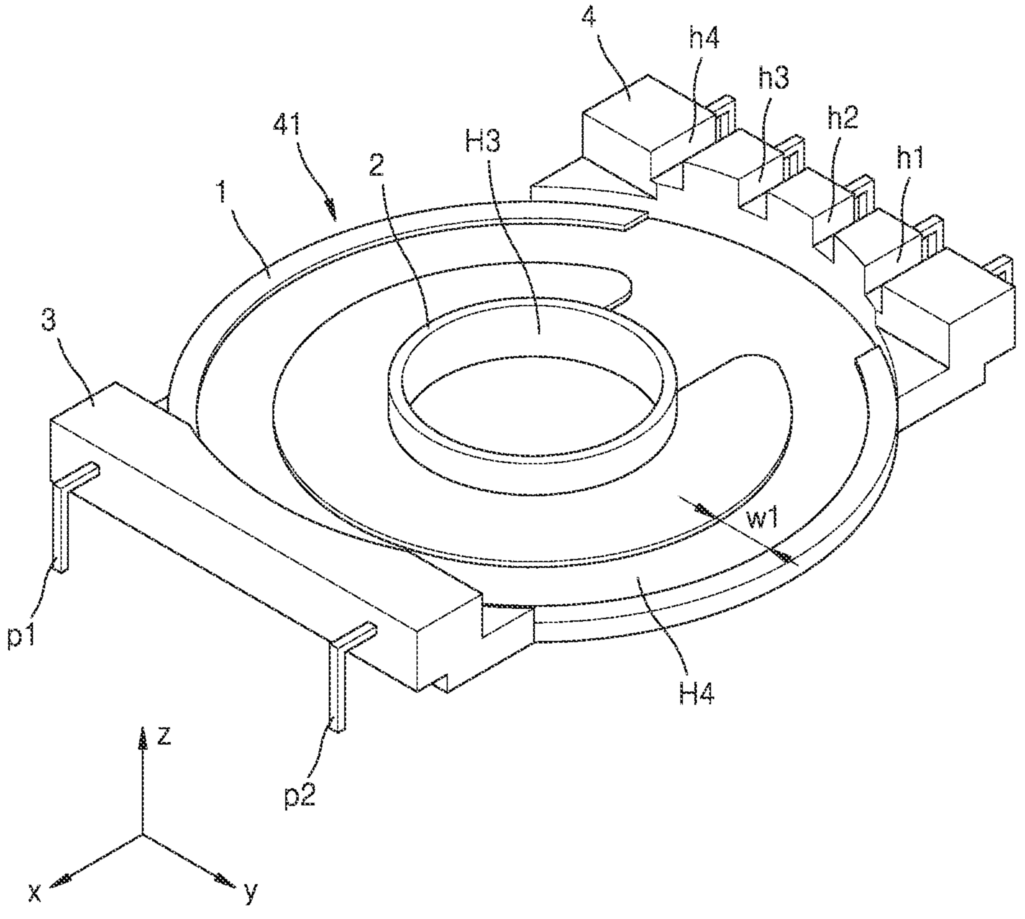
FIG. 7 is a schematic perspective view illustrating an example structure of a bobbin included in the coil structure of FIG. 5.
Figure 8:
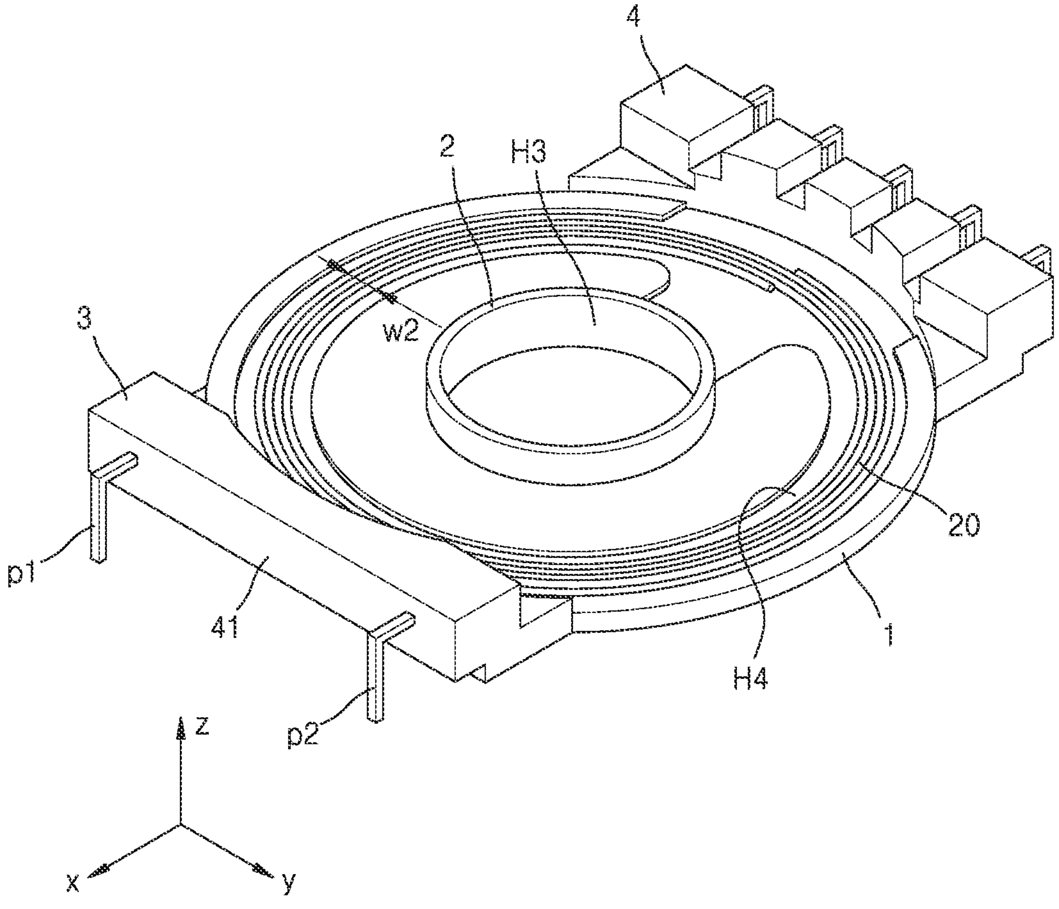
FIG. 8 is a schematic perspective view illustrating a structure in which a detection coil is provided on the bobbin of FIG. 5.
Figure 9:
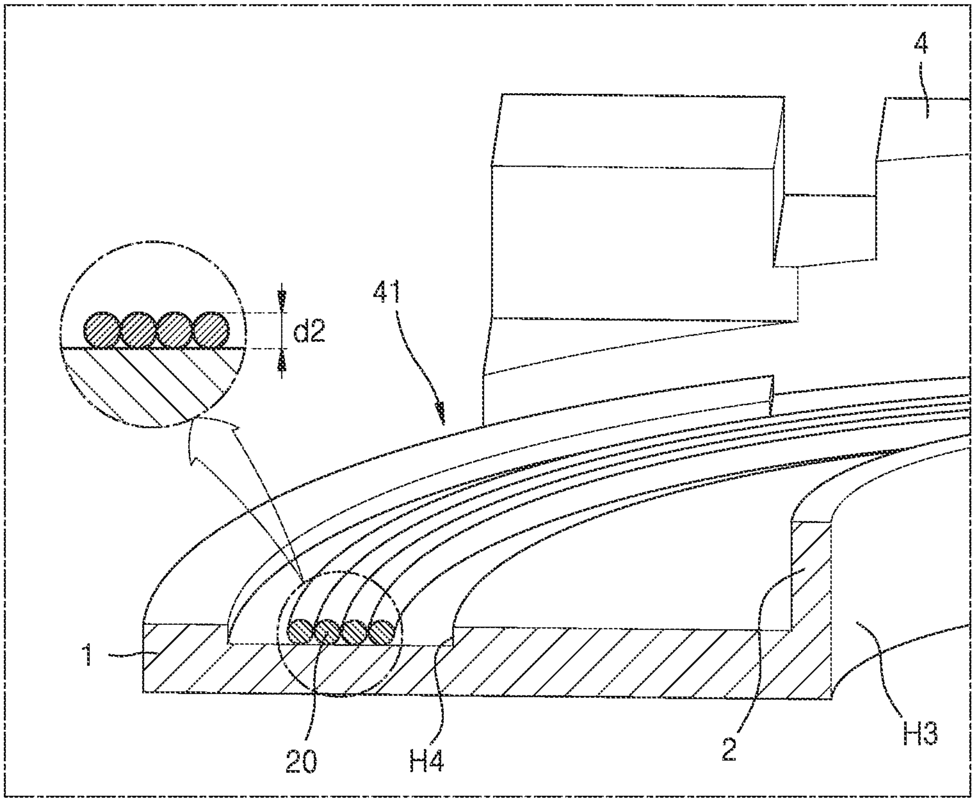
FIG. 9 is a schematic view illustrating a partial cross-section of a structure in which a detection coil is provided on the bobbin of FIG. 5.
Figure 10:
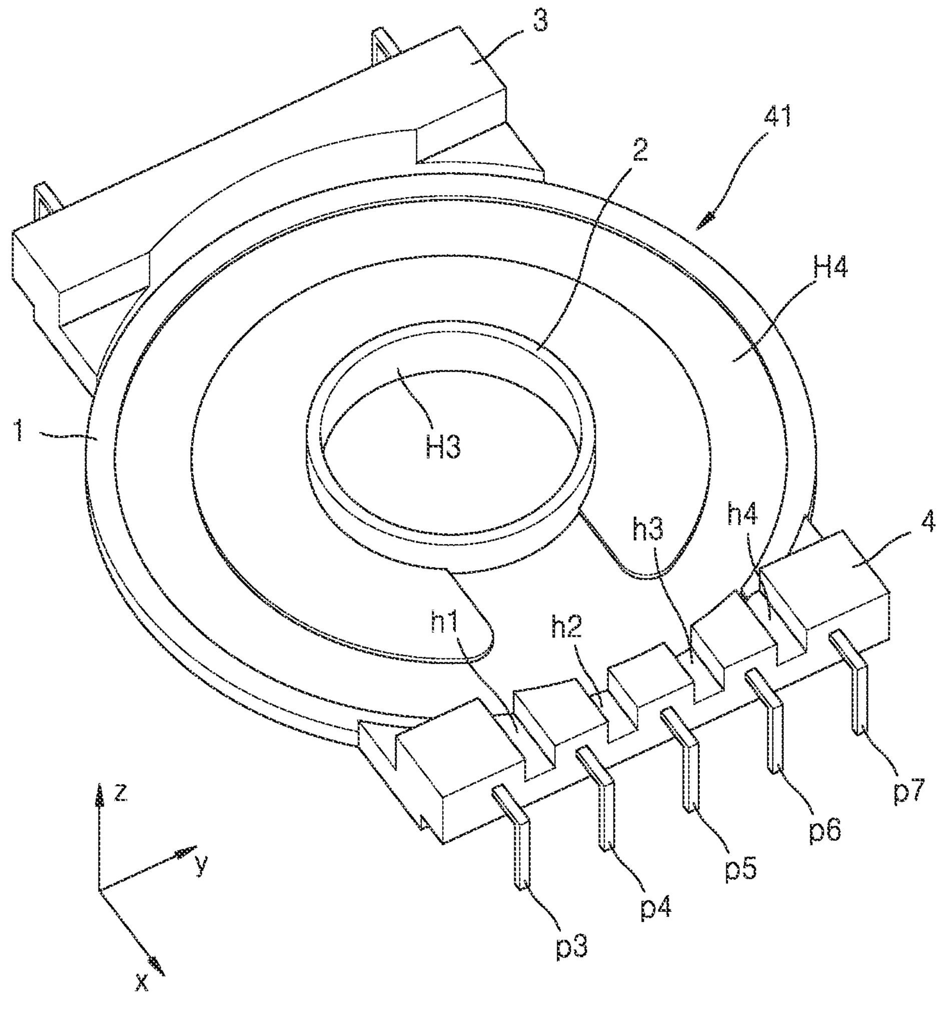
FIG. 10 is a schematic perspective view illustrating an example structure of the bobbin of FIG. 5.

FIG. 5 is a schematic perspective view illustrating an example structure of a coil structure 120 according to another embodiment. FIG. 6 is a schematic perspective view illustrating an example internal structure of the coil structure 120 of FIG. 5. FIG. 7 is a schematic perspective view illustrating an example structure of a bobbin 41 included in the coil structure 120 of FIG. 5. FIG. 8 is a schematic perspective view illustrating a structure in which a detection coil 20 is provided on the bobbin 41 of FIG. 5. FIG. 9 is a schematic view illustrating a partial cross-section of a structure in which the detection coil 20 is provided on the bobbin 41 of FIG. 5. FIG. 10 is a schematic perspective view illustrating an example structure of the bobbin 41 of FIG. 5.

The coil structure 120 of FIG. 5 may be substantially the same as the coil structure 110 of FIG. 4, except that the bobbin 41 further includes a first sidewall 3 and a second sidewall 4. Regarding FIGS. 5 to 10, descriptions which are the same as those with respect to FIGS. 2 to 4 are omitted. The internal structure of the coil structure 120 of FIG. 5 and the structure of the bobbin 41 of FIG. 5 are described below with reference to FIGS. 6 to 10.

Referring to FIGS. 6 to 8, the coil structure 120 may include a bobbin 41 including a support plate 1, in which a groove H4 is provided in a partial region thereof, and a pillar 2 extending upwardly at the center of the support plate 1, an inductor coil 10 provided to surround the pillar 2 on the support plate 1, and a detection coil 20 inserted into a groove H4 and electromagnetically coupled to the inductor coil 20. A through hole H3 may be formed in the centers of the support plate 1 and the pillar 2.

The inductor coil 10 may be formed by winding a first wire having conductivity in a double layer. For example, as shown in FIG. 6, the inductor coil 10 may be configured to include a first layer 10*a* and a second layer 10*b*. However, the disclosure is not limited thereto, and the inductor coil 10 may be formed by winding the first wire in three or more layers. A diameter d1 of the cross-section of the first wire constituting the inductor coil 10 may be about 1 mm or less. However, the disclosure is not limited thereto, and if necessary, the first wire may be formed to have a diameter d1 greater than 1 mm.

The detection coil 20 may be formed by winding a second wire having conductivity in a single layer. For example, as shown in FIGS. 8 and 9, the detection coil 20 may be formed by winding the second wire four times on a single layer. However, the disclosure is not limited thereto, and the inductor coil 10 may be formed by winding the second wire three times or less or five or more times on a single layer. In addition, the inductor coil 10 may be formed by winding the second wire in two or more layers. A diameter d2 of the cross section of the second wire constituting the detection coil 20 may be less than the diameter d1 of the cross section of the first wire constituting the inductor coil 10. For example, the diameter d2 of the cross section of the second wire constituting the detection coil 20 may be about 0.5 mm or less. However, the disclosure is not limited thereto, and if necessary, the second wire may be formed to have a diameter d2 greater than 0.5 mm.

The bobbin 41 may include a support plate 1 and a pillar 2. The bobbin 41 may be a structure that supports the inductor coil 10 and may be referred to as a 'support unit'. A groove H4 into which the detection coil 20 may be inserted may be formed in a partial region of the support plate 1. The groove H4 may have a ring shape. Referring to FIGS. 7 and 8, a first width w1 of the groove H4 may be greater than a second width w2 of the detection coil 20. The first width w1 of the groove H4 may denote the shortest linear distance between the outer circumference and the inner circumference of the groove H4 having a ring shape. The second width w2 of the detection coil 20 may denote the shortest linear distance between the outer circumference and the inner circumference of the detection coil 20 formed by winding the second wire and having a ring shape. Because the first width w1 of the groove H4 is greater than the second width w2 of the detection coil 20, the detection coil 20 may be inserted into the groove H4 with a sufficient margin. For example, the first width w1 of the groove H4 may be about 2 mm or more. The bobbin 41 may include a first sidewall 3 provided on one side of the pillar 2 and a second sidewall 4 provided on the other side of the pillar 2. The first sidewall 3 and the second sidewall 4 may each have a shape extending upwardly from an edge region of the support plate 1.

The first sidewall 3 and the second sidewall 4 may be provided to face each other in a second direction (an x-axis direction) crossing a first direction (a y-axis direction). In this case, the first direction (the y-axis direction) and the second direction (the x-axis direction) may be perpendicular to each other. The first sidewall 3 and the second sidewall 4 may be formed to protrude to the outside of a housing 30 through an opening 30*h* formed through the housing 30 in the second direction (the x-axis direction). A certain space may be formed between the first sidewall 3 and the pillar 2 and between the second sidewall 4 and the pillar 2, and the inductor coil 10 may be stably provided in the space. In this case, a certain separation distance may be formed between the inductor coil 10 and the first sidewall 3 or between the inductor coil 10 and the second sidewall 4. However, the disclosure is not limited thereto, and the inductor coil 10 and the first sidewall 3 or the inductor coil 10 and the second sidewall 4 may be provided to contact each other.

In addition, each of the first sidewall 3 and the second sidewall 4 may include a curved portion corresponding to at least a portion of the outer periphery of the inductor coil 10. In this case, curved portions of the first sidewall 3 and the second sidewall 4 may surround at least a portion of the outer periphery of the inductor coil 10.

Referring to FIGS. 7 and 8, the first sidewall 3 may have a step shape. At least a portion of the first sidewall 3 may protrude to the outside of the housing 30 through an opening (e.g., the opening 30*h* in FIG. 2). At least one connection pin, that is, first and second connection pins p1 and p2, may be formed on the side of the first sidewall 3. For example, the first connection pin p1 and the second connection pin p2 may be formed to be spaced apart from each other on the side of the first sidewall 3. However, the disclosure is not limited thereto, and three or more connection pins may be formed on the side of the first sidewall 3. The least one connection pin, that is, the first and second connection pins p1 and p2, may extend below the support plate 1.

Referring to FIG. 10, the second sidewall 4 may have a step shape. At least a portion of the second sidewall 4 may protrude to the outside of the housing 30 through an opening (e.g., the opening 30*h* in FIG. 2). At least one connection pin, that is, third to seventh connection pins p3, p4, p5, p6, and p7, may be formed on the side of the second sidewall 4. For example, the third connection pin p3, the fourth connection pin p4, the fifth connection pin p5, the sixth connection pin p6, and the seventh connection pin p7 may be formed to be spaced apart from one another on the side of the second sidewall 4. However, the disclosure is not limited thereto, and five or more connection pins may be formed on the side of the second sidewall 4. The at least one connection pin, that is, the third to seventh connection pins p3, p4, p5, p6, and p7, may extend below the support plate 1.

The first connection pin p1, the second connection pin p2, the third connection pin p3, the fourth connection pin p4, the fifth connection pin p5, the sixth connection pin p6, and the seventh connection pin p7 may each have a "¬" shape. In this case, one end of the first connection pin p1 and one end of the second connection pin p2 may be connected to the side of the first sidewall 3, and the other end of the first connection pin p1 and the other end of the second connection pin p2 may extend toward the lower side of the bobbin 41. In addition, one end of the third connection pin p3, one end of the fourth connection pin p4, one end of the fifth connection pin p5, one end of the sixth connection pin p6, and one end of the seventh connection pin p7 may be connected to the side of the second sidewall 4, and the other end of the third connection pin p3, the other end of the fourth connection pin p4, the other end of the fifth connection pin p5, the other end of the sixth connection pin p6, and the other end of the seventh connection pin p7 may extend toward the lower side of the bobbin 41.

The first connection pin p1, the second connection pin p2, the third connection pin p3, the fourth connection pin p4, the fifth connection pin p5, the sixth connection pin p6, and the seventh connection pin p7 may each include, for example, a conductive material. When the first connection pin p1, the second connection pin p2, the third connection pin p3, the fourth connection pin p4, the fifth connection pin p5, the sixth connection pin p6, and the seventh connection pin p7 are mounted on a printed circuit board, the coil structure 120 may be electrically connected to the printed circuit board.

In addition, referring to FIGS. 7 and 8, a plurality of lead-out grooves h1, h2, h3, and h4 may be formed on the upper surface of the second sidewall 4. For example, on the upper surface of the second sidewall 4, a first lead-out groove h1, a second lead-out groove h2, a third lead-out groove h3, and a fourth lead-out groove h4 may be formed to be spaced apart from one another. Lead wires drawn out from the inductor coil 10 and the detection coil 20 may be provided in the plurality of lead-out grooves h1, h2, h3, and h4. The lead wires from the inductor coil 10 and the detection coil 20 may be drawn out of the bobbin 41 through the plurality of lead-out grooves h1, h2, h3, and h4.

Figure 11:
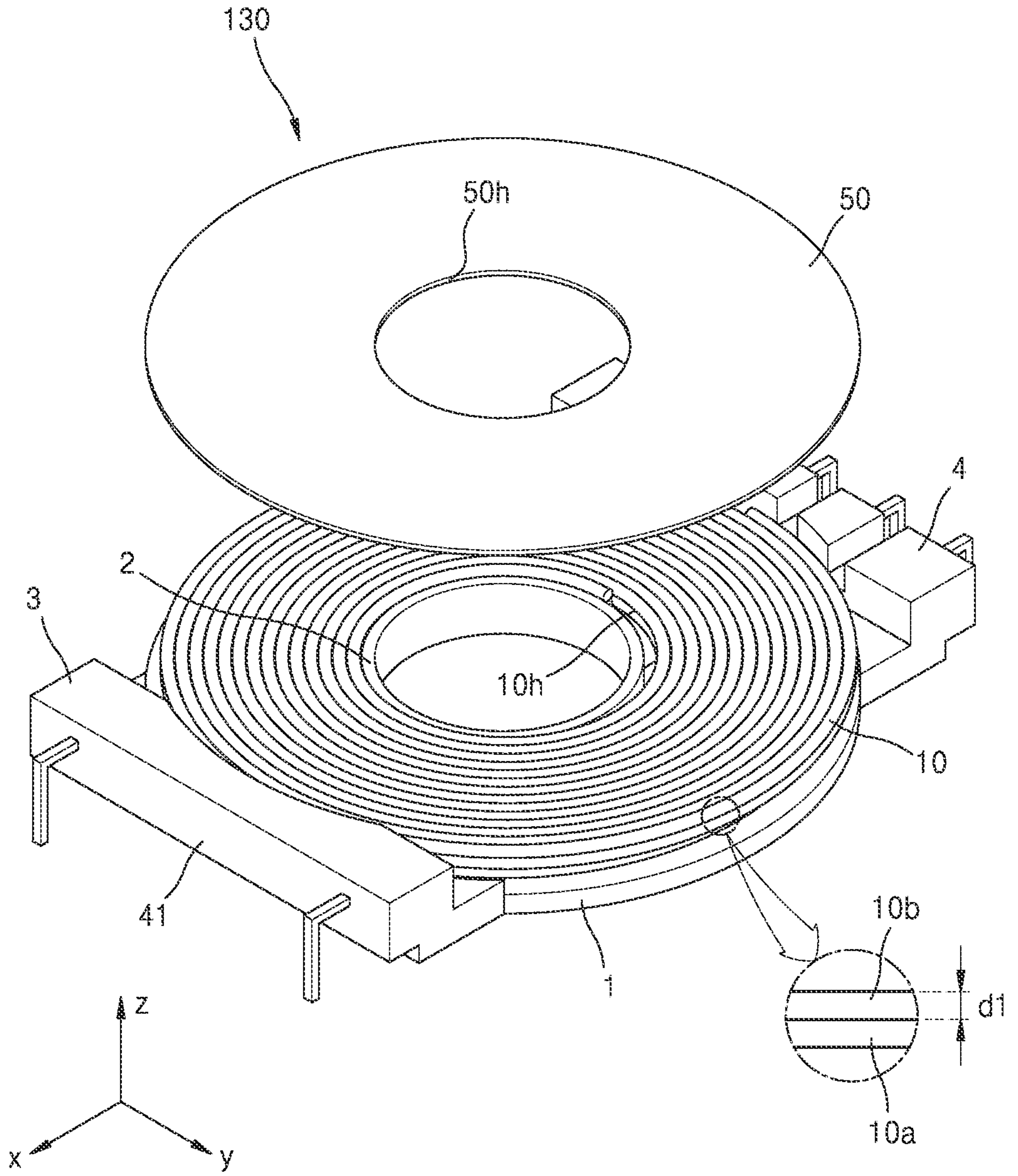
FIG. 11 is a schematic perspective view illustrating an example structure of a coil structure according to another embodiment.

FIG. 11 is a schematic perspective view illustrating an example structure of a coil structure 130 according to another embodiment.

The coil structure 130 of FIG. 11 may be substantially the same as the coil structure 120 of FIG. 5, except that the coil structure 130 further includes an insulating layer 50. Regarding FIG. 11, descriptions which are the same as those with respect to FIGS. 2 and 10 are omitted. In FIG. 11, the housing 30 is omitted.

Referring to FIG. 11, the coil structure 130 may further include an insulating layer 50 provided on an inductor coil 10. For example, the insulating layer 50 may be provided in a region between an upper magnetic body 31 and the inductor coil 10. The insulating layer 50 may prevent current that may flow from the inductor coil 10 from leaking to the outside of the coil structure 130.

The insulating layer 50 may have a donut shape in which an insulating hole 50*h* is formed in the center thereof. For example, the insulating layer 50 may have a shape corresponding to the inductor coil 10 having a donut shape in which a central hole 10*h* is formed. Accordingly, the insulating layer 50 may surround a pillar 2 and cover the upper surface of the inductor coil 10, and the inductor coil 10 may be insulated from the upper magnetic body 31.

Figure 12:
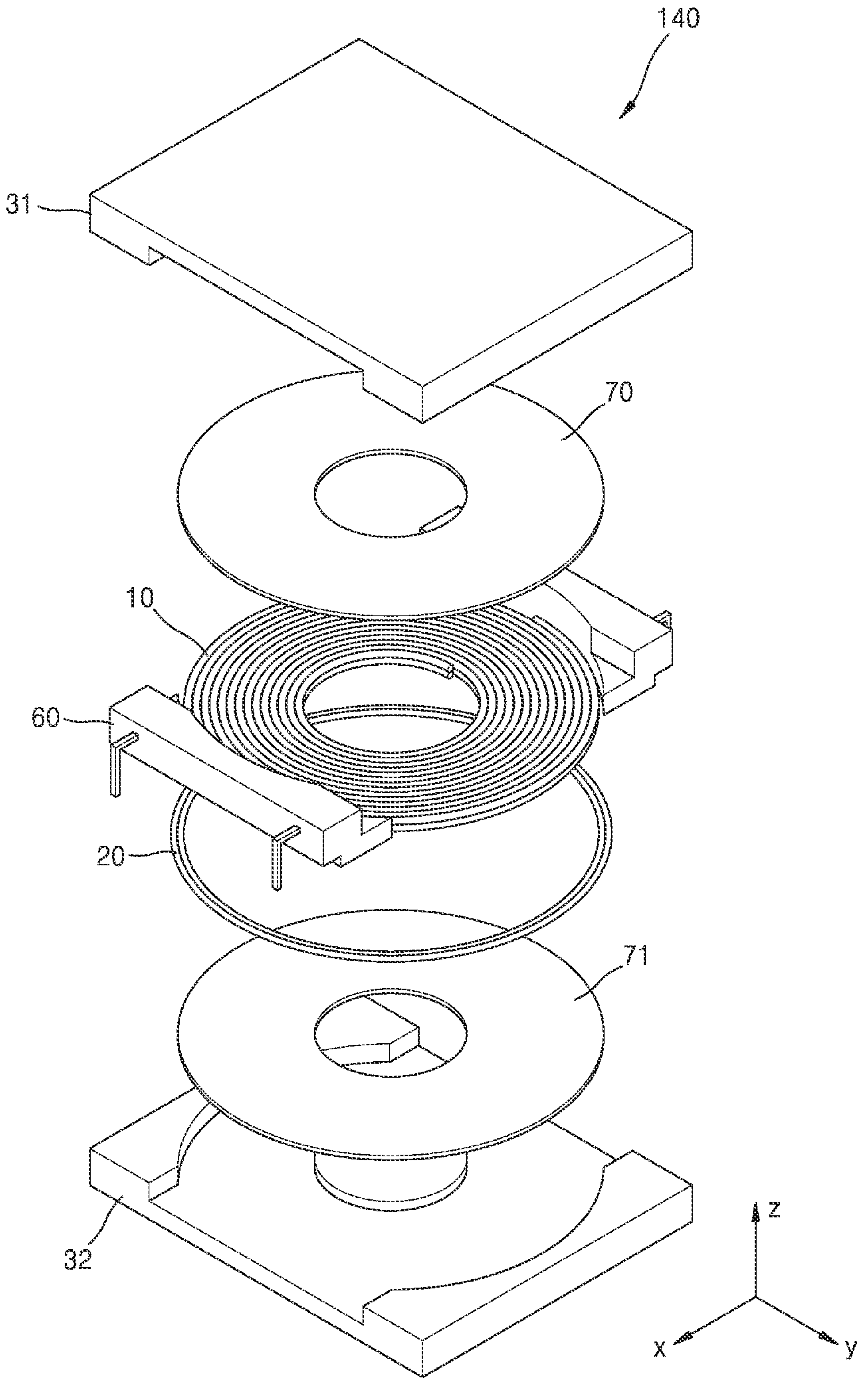
FIG. 12 is a schematic exploded view illustrating an example structure of a coil structure according to another embodiment.
Figure 13:
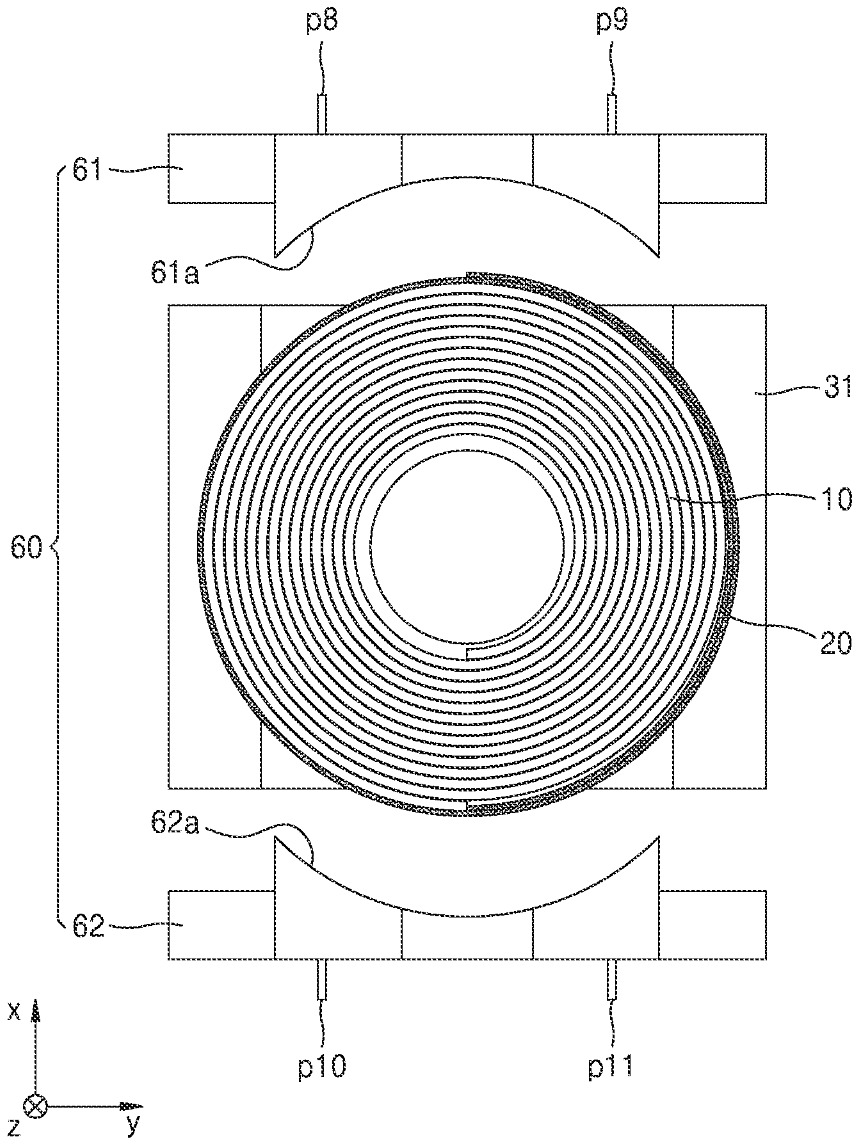
FIG. 13 is a schematic view illustrating an example structure of a support unit included in the coil structure of FIG. 12.

FIG. 12 is a schematic exploded view illustrating an example structure of a coil structure 140 according to another embodiment. FIG. 13 is a schematic view illustrating an example structure of a support unit 60 included in the coil structure 140 of FIG. 12.

The coil structure 140 of FIG. 12 may be substantially the same as the coil structure 100 of FIG. 2, except that the coil structure 140 further includes a support unit 60 and insulating layers 70 and 71. Regarding FIG. 12, descriptions which are the same as those with respect to FIGS. 2 to 4 are omitted.

Referring to FIG. 12, the coil structure 140 may include an inductor coil 10 having a self-bonding wire structure, a detection coil 20 electromagnetically coupled to the inductor coil 10, and a housing 30 including an upper magnetic body 31 and a lower magnetic body 32 facing each other to form an inner space in which the inductor coil 10 and the detection coil 20 are provided.

In addition, the coil structure 140 may further include a support unit 60 supporting the periphery of the inductor coil 10, at least a portion of the support unit 60 protruding out of the housing 30 through an opening (e.g., the opening 30*h* in FIG. 2) of the housing 30.

Referring to FIG. 13, the support unit 60 may be formed to support both sides of the inductor coil 10 in a second direction (an x-axis direction). The support unit 60 may include a first support element 61 and a second support element 62 provided to face each other in the second direction (the x-axis direction) crossing a first direction (a y-axis direction). In this case, the first direction (the y-axis direction) and the second direction (the x-axis direction) may be perpendicular to each other. The first support element 61 and the second support element 62 may protrude to the outside of the housing 30 through an opening 30*h* formed through the housing 30 in the second direction (the x-axis direction).

For example, the support unit 60 may include a first support element 61 in contact with a first side of both sides of the inductor coil 10 in the second direction (the x-axis direction), and a second support element 61 in contact with a second side of the both sides, which is opposite the first side.

A region of the first support element 61, which is in contact with the inductor coil 10, may include a curved portion 61*a*. The curved portion 61*a* may be formed to be in contact with the outer periphery of the inductor coil 10. At least one connection pin p8 and p9 may be provided on the outer side of the first support element 61. A region of the second support element 62, which is in contact with the inductor coil 10, may include a curved portion 62*a*. The curved portion 62*a* may be formed to be in contact with the outer periphery of the inductor coil 10. At least one connection pin p10 and p11 may be provided on the outer side of the first support element 62.

At least one connection pin p8, p9, p10, and p11 provided on the support unit 60 may include, for example, a conductive material. When the at least one connection pin p8, p9, p10, and p11 is mounted on a printed circuit board, the coil structure 140 may be electrically connected to the printed circuit board.

Referring back to FIG. 12, the coil structure 140 may include insulating layers 70 and 71 provided in at least one of a first region between the upper magnetic body 31 and the inductor coil 10 and a second region between the lower magnetic body 32 and the inductor coil 10. For example, the insulating layer 70 may be provided in the first region between the upper magnetic body 31 and the inductor coil 10. In addition, the insulating layer 71 may be provided in the second region between the lower magnetic body 32 and the inductor coil 10. The insulating layers 70 and 71 may prevent current that may flow from the inductor coil 10 from leaking to the outside of the coil structure 140.

Each of the insulating layers 70 and 71 may have a donut shape in which an insulating hole is formed in the center thereof. For example, each of the insulating layers 70 and 71 may have a shape corresponding to the inductor coil 10 having a donut shape in which a central hole (e.g., the central hole 10*h* in FIG. 2) is formed. Accordingly, the insulating layers 70 and 71 may surround protrusions (e.g., the protrusions 31*b* and 32*b* in FIG. 2) of the upper magnetic body 31 and the lower magnetic body 32, and may cover the upper surface of the inductor coil 10.

Figure 14:
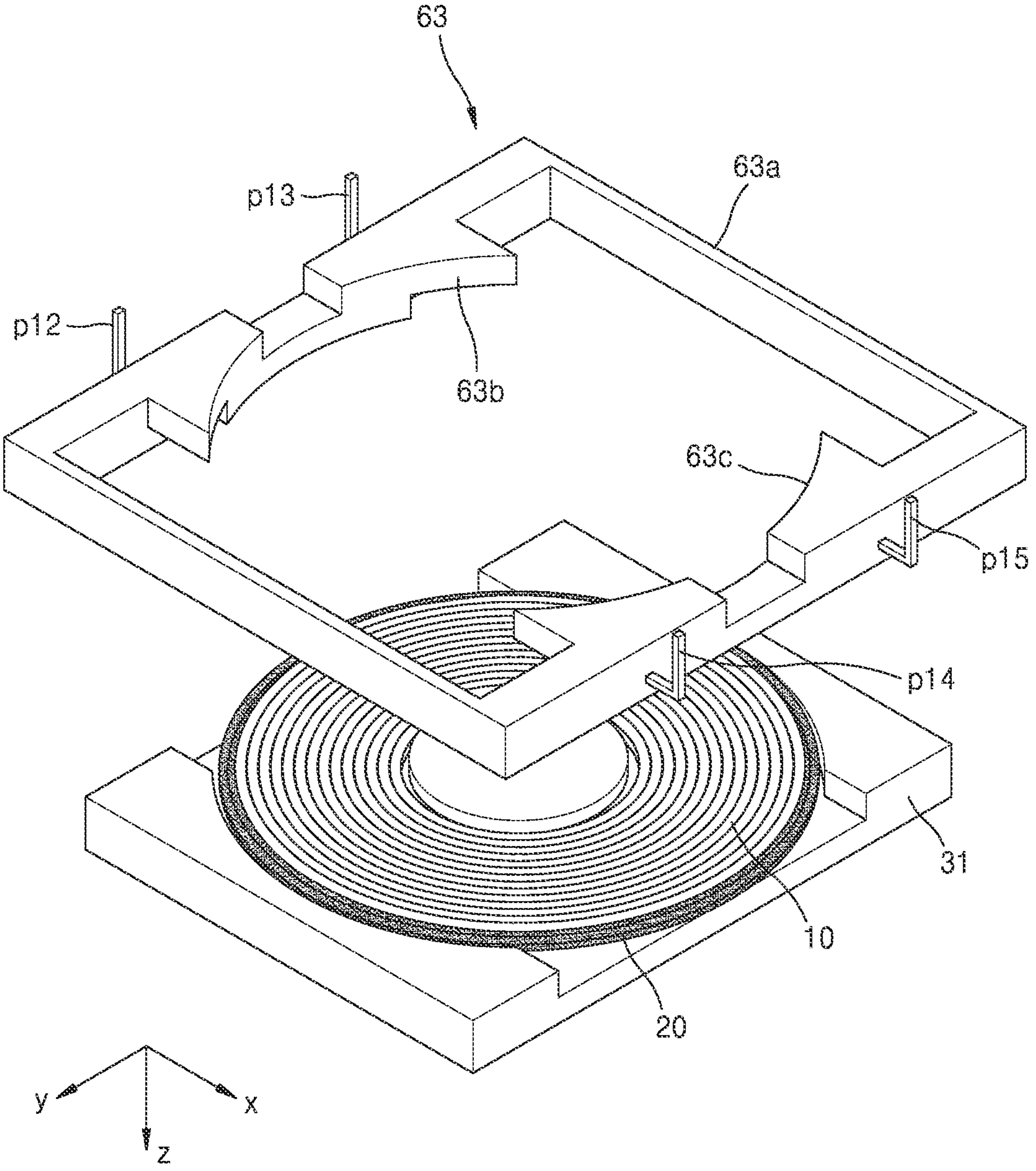
FIG. 14 is a schematic view illustrating an another example structure of a support unit that may be included in the coil structure of FIG. 12.

FIG. 14 is a schematic view illustrating an another example structure of a support unit 63 that may be included in the coil structure 140 of FIG. 12.

Referring to FIG. 14, the support unit 63 may be formed to support both sides of the inductor coil 10 in a second direction (an x-axis direction). For example, the support unit 60 may include a peripheral portion 63*a* formed to surround the periphery of the upper magnetic body 31. For example, the peripheral portion 63*a* may include an inner surface and an outer surface, and may have a shape in which a thin plate surrounds the periphery of the upper magnetic body 31. Accordingly, the peripheral portion 63*a* may include an opening exposing the upper magnetic body 31, the inductor coil 10, and the detection coil 20 in a third direction (a z-axis direction) perpendicular to a plane parallel to the peripheral portion 63*a*.

In addition, the support unit 63 may include a first curved portion 63*b* in contact with a first side of both sides of the inductor coil 10 in the second direction (the x-axis direction), and a second curved portion 63*c* in contact with a second side of the both sides, which is opposite to the first side. The first curved portion 63*b* and the second curved portion 63*c* may be provided on the inner surface of the peripheral portion 63*a*. For example, the first curved portion 63*b* and the second curved portion 63*c* may be provided on both inner surfaces of the peripheral portion 63*a* facing each other in the second direction (the x-axis direction).

At least one connection pin p12, p13, p14, and p15 may be provided on the outer side of the support unit 63. For example, a number of two of each of the at least one connection pin p12, p13, p14, and p15 may be provided on both outer sides of the support unit 63 facing each other in the second direction (the x-axis direction).

The at least one connection pin p12, p13, p14, and p15 provided on the support unit 63 may include, for example, a conductive material. When the at least one connection pin p12, p13, p14, and p15 is mounted on a printed circuit board, the coil structure 140 may be electrically connected to the printed circuit board.

Figure 15:
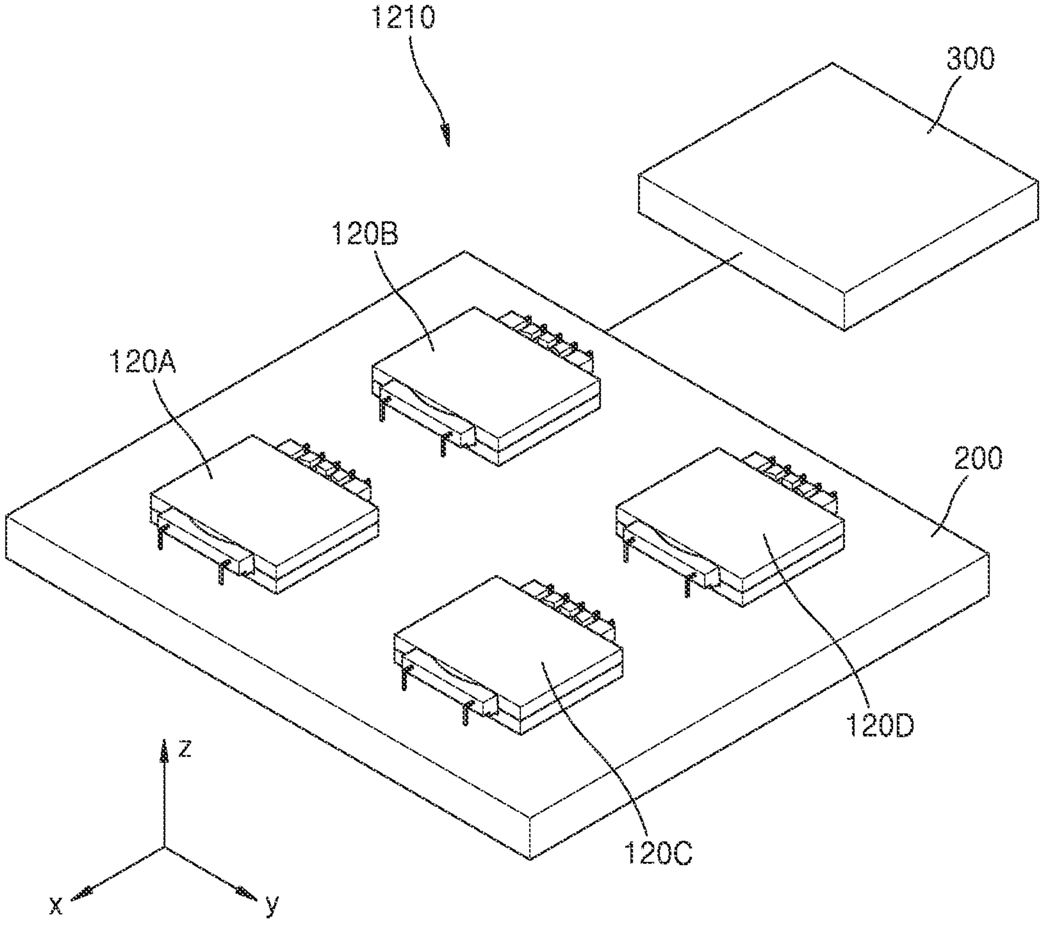
FIG. 15 is a schematic perspective view illustrating an example structure of a power factor correction (PFC) circuit according to an embodiment.

FIG. 15 is a schematic perspective view illustrating an example structure of a PFC circuit 1210 according to an embodiment.

Referring to FIG. 15, the PFC circuit 1210 may include a plurality of coil structures 120A, 1208, 120C, and 120D, a printed circuit board 200 on which the plurality of coil structures 120A, 120B, 120C, and 120D are mounted, and an electromagnetic signal detector 300 for detecting electromagnetic signals from the plurality of coil structures 120A, 120B, 120C, and 120D. However, the disclosure is not limited thereto, and the PFC circuit 1210 may include a single coil structure.

The PFC circuit 1210 may include a first coil structure 120A, a second coil structure 1208, a third coil structure 120C, and a fourth coil structure, which are provided on a printed circuit board 200 to be spaced apart from each other. However, the disclosure is not limited thereto, and the PFC circuit 1210 may include five or more coil structures. Each of the plurality of coil structures 120A, 1208, 120C, and 120D may include any one of the coil structures 100, 110, 120, 130, and 140 described with reference to FIGS. 1 to 14.

The printed circuit board 200 may be a board on which various electronic devices may be mounted, and may allow the plurality of coil structures 120A, 120B, 120C, and 120D to be electrically connected to one another. In addition, various other electronic devices that may be provided on the printed circuit board 200 may be electrically connected to the plurality of coil structures 120A, 1208, 120C, and 120D.

The electromagnetic signal detector 300 may independently detect electromagnetic signals from each of the plurality of coil structures 120A, 120B, 120C, and 120D. For example, the electromagnetic signal detector 300 may include a current measuring device that detects a current signal from a detection coil included in each of the plurality of coil structures 120A, 120B, 120C, and 120D. For example, a lead wire extending and drawn out from the detection coil included in each of the plurality of coil structures 120A, 120B, 120C, and 120D may be electrically connected to the electromagnetic signal detector 300 through the printed circuit board 200.

Through the electromagnetic signal detector 300, a difference between current signals detected from the plurality of coil structures 120A, 1208, 120C, and 120D may be determined, and based on this, the current signals detected from the plurality of coil structures 120A, 1208, 120C, and 120D may be adjusted to be equal to each other.

Through an example embodiment according to the disclosure, a slimmed coil structure applicable to a PFC circuit, a PFC circuit including the slimmed coil structure, and a power supply including the PFC circuit may be provided.

Through an example embodiment according to the disclosure, a coil structure slimmed by including an inductor coil that may be fixed to a bobbin without an upper plate, a PFC circuit including the coil structure, and a power supply including the PFC circuit may be provided.

Through an example embodiment according to the disclosure, a slimmed coil structure having a space, in which a detection coil capable of detecting a current flowing through an inductor coil is inserted, by including a groove formed in a support plate may be provided, and a PFC circuit including the slimmed coil structure and a power supply including the PFC circuit may be provided.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A coil structure comprising:

an inductor coil including a self-bonding wire and a central hole;

a detection coil electromagnetically coupled to the inductor coil;

a support unit surrounding at least a portion of an outer periphery of the inductor coil; and a housing including an upper magnetic body and a lower magnetic body facing each other in a vertical direction with the inductor coil therebetween to form an inner space in which the inductor coil and the detection coil are provided, the upper magnetic body and the lower magnetic body each including a protrusion inserted into the central hole of the inductor coil, wherein the support unit includes a bobbin including a support plate having a groove in a partial region and a pillar extending upwardly from a center of the support plate, wherein a through hole is formed in centers of the support plate and the pillar, the inductor coil is provided on the support plate to surround the pillar, and the detection coil is inserted into the groove.

2. The coil structure of claim 1, wherein each of the upper magnetic body and the lower magnetic body includes a flat plate in which the protrusion is provided in a center thereof, and a first edge structure and a second edge structure provided on respective sides of the protrusion and surrounding the protrusion, wherein the first edge structure and the second edge structure face each other in a first direction, and the housing includes an opening exposing the inner space to outside on both sides of the housing in a second direction crossing the first direction.

3. The coil structure of claim 2, wherein the lower magnetic body covers a lower surface of the support plate, the upper magnetic body covers an upper portion of the pillar and the inductor coil, and the protrusion of each of the lower magnetic body and the upper magnetic body is inserted into the through hole.

4. The coil structure of claim 3, wherein the bobbin includes a first sidewall provided on one side of the pillar and a second sidewall provided on the other side of the pillar, the first sidewall having a shape extending upwardly from an edge region of the support plate, and the second sidewall having a shape extending upwardly from an another edge region of the support plate, wherein each of the first sidewall and the second sidewall includes a curved portion corresponding to at least a portion of the outer periphery of the inductor coil, and the curved portion surrounds at least a portion of the outer periphery of the inductor coil.

5. The coil structure of claim 4, wherein at least a portion of the first sidewall and at least a portion of the second sidewall protrude to the outside of the housing through the opening of the housing.

6. The coil structure of claim 3, wherein a height of the pillar is 2 mm or less.

7. The coil structure of claim 3, wherein the groove has a ring shape.

8. The coil structure of claim 3, wherein a width of the groove is greater than a width of the detection coil.

9. The coil structure of claim 3, wherein a depth of the groove is 0.5 mm or less.

10. The coil structure of claim 3, wherein a thickness of the support plate is 1 mm or less.

11. The coil structure of claim 2, wherein the support unit surrounds at least a portion of the outer periphery of the inductor coil, and at least a portion of the support unit protrudes to the outside of the housing through the opening of the housing.

12. The coil structure of claim 2, further comprising an insulating layer provided in at least one of a first region between the lower magnetic body and the inductor coil and a second region between the upper magnetic body and the inductor coil, the insulating layer surrounding the protrusion.

13. The coil structure of claim 1, wherein the inductor coil is formed by winding a first wire having conductivity in a double layer.

14. The coil structure of claim 1, wherein the detection coil includes a self-bonding wire.

15. The coil structure of claim 1, wherein a diameter of a cross section of a second wire constituting the detection coil is less than a diameter of a cross section of a first wire constituting the inductor coil.

16. The coil structure of claim 15, wherein a diameter of the cross section of the second wire constituting the detection coil is 0.5 mm or less.

17. A power factor correction circuit comprising:

a plurality of coil structures;

a printed circuit board on which the plurality of coil structures are mounted; and an electromagnetic signal detector configured to detect electromagnetic signals received from the plurality of coil structures, wherein each of the plurality of coil structures includes:

an inductor coil having a self-bonding wire structure and including a central hole;

a detection coil electromagnetically coupled to the inductor coil; a support unit surrounding at least a portion of an outer periphery of the inductor coil; and a housing including an upper magnetic body and a lower magnetic body facing each other in a vertical direction with the inductor coil therebetween to form an inner space in which the inductor coil and the detection coil are provided, the upper magnetic body and the lower magnetic body each including a protrusion inserted into the central hole of the inductor coil, wherein the support unit includes a bobbin including a support plate having a groove in a partial region and a pillar extending upwardly from a center of the support plate, wherein a through hole is formed in centers of the support plate and the pillar, the inductor coil is provided on the support plate to surround the pillar, and the detection coil is inserted into the groove.

18. A power supply comprising:

a rectifier configured to rectify an AC voltage received from outside;

a transformer configured to modulate a voltage rectified by the rectifier; and a power factor correction circuit configured to improve a power factor for the transformer, wherein the power factor correction circuit includes:

an inductor coil having a self-bonding wire structure and including a central hole; a detection coil electromagnetically coupled to the inductor coil; a support unit surrounding at least a portion of an outer periphery of the inductor coil; and a housing including an upper magnetic body and a lower magnetic body facing each other in a vertical direction with the inductor coil therebetween to form an inner space in which the inductor coil and the detection coil are provided, the upper magnetic body and the lower magnetic body each including a protrusion inserted into the central hole of the inductor coil, wherein the support unit includes a bobbin including a support plate having a groove in a partial region and a pillar extending upwardly from a center of the support plate, wherein a through hole is formed in centers of the support plate and the pillar, the inductor coil is provided on the support plate to surround the pillar, and the detection coil is inserted into the groove.

* * * * *